United States Patent
Yamanaka et al.

(10) Patent No.: US 9,061,253 B2
(45) Date of Patent: Jun. 23, 2015

(54) GAS SEPARATION MEMBRANE

(75) Inventors: Kazuhiro Yamanaka, Tachikawa (JP); Tsuyoshi Ogawa, Iruma-gun (JP); Takeshi Suda, Fujimino (JP); Hiroki Uoyama, Iruma-gun (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 13/880,334

(22) PCT Filed: May 30, 2012

(86) PCT No.: PCT/JP2012/063861
§ 371 (c)(1),
(2), (4) Date: Jul. 5, 2013

(87) PCT Pub. No.: WO2012/165455
PCT Pub. Date: Dec. 6, 2012

(65) Prior Publication Data
US 2014/0174293 A1   Jun. 26, 2014

(30) Foreign Application Priority Data

May 30, 2011 (JP) .................. 2011-121028
May 24, 2012 (JP) .................. 2012-118431

(51) Int. Cl.
| B01D 71/64 | (2006.01) |
| B01D 53/22 | (2006.01) |
| C08G 73/10 | (2006.01) |
| C08L 79/08 | (2006.01) |
| B01D 71/82 | (2006.01) |

(52) U.S. Cl.
CPC .............. B01D 71/64 (2013.01); B01D 53/228 (2013.01); C08G 73/1039 (2013.01); C08G 73/1046 (2013.01); C08L 79/08 (2013.01); B01D 71/82 (2013.01); B01D 2323/30 (2013.01); C08G 73/1042 (2013.01); C08G 73/105 (2013.01); C08G 73/1071 (2013.01)

(58) Field of Classification Search
CPC ...... B01D 53/228; B01D 71/64; B01D 71/82; B01D 67/0093; B01D 2235/022; C08L 79/08; C08G 73/1071
USPC ........... 95/45, 51, 53; 96/4, 14; 528/125, 172, 528/188, 353; 525/423, 434
See application file for complete search history.

(56) References Cited

U.S. PATENT DOCUMENTS

| 3,133,132 | A |   | 5/1964 | Loeb et al. |
| 5,320,650 | A | * | 6/1994 | Simmons ..................... 96/14 |
| 5,391,219 | A | * | 2/1995 | Matsumoto et al. ............. 95/51 |
| 5,647,894 | A | * | 7/1997 | Ohara et al. ..................... 96/14 |
| 2009/0292104 | A1 | * | 11/2009 | Saegusa et al. ............... 528/331 |
| 2010/0029895 | A1 |   | 2/2010 | Narizuka et al. |
| 2010/0234556 | A1 |   | 9/2010 | Saegusa et al. |
| 2011/0232484 | A1 | * | 9/2011 | Yoshinaga et al. ................. 95/45 |

FOREIGN PATENT DOCUMENTS

| JP | 2007-119503 A | 5/2007 |
| JP | 2007-119504 A | 5/2007 |
| JP | 2008-150534 A | 7/2008 |
| WO | WO 2010/038810 A1 | 4/2010 |

OTHER PUBLICATIONS

Kenichi Okamoto et al., Polymer Application, vol. 41, No. 1, pp. 16-27, 1992 (Japanese-language).
S. A. Stern, Polymers for Gas Separations: The Next Decade, Journal of Membrane Science, vol. 94, pp. 1-65, 1994, Department of Chemical Engineering and Materials Science, Syracuse University, Syracuse, NY, USA.
Japanese Industrial Standard JIS K 7126-1 : 2006, Plastics-Film and Sheeting-Determination of Gas-Transmission Rate—Part 1 (Japanese-language).
International Search Report dated Aug. 14, 2012 with English translation (five (5) pages).
Japanese-language Written Opinion (PCT/ISA/237) dated Aug. 14, 2012 (three (3) pages).

* cited by examiner

*Primary Examiner* — Jason M Greene
(74) *Attorney, Agent, or Firm* — Crowell & Moring LLP

(57) ABSTRACT

[Problem] Diamine and carboxylic dianhydride for polymerizing a hexafluoroisopropylidene group-containing polyimide are limited in chemical structure when developed into a polyimide membrane, so that it is difficult to design a chemical structure with consideration paid to the strength and separation performance of a gas separation membrane. A gas separation membrane easily soluble in an organic solvent, excellent in formability so as to be readily usable for a gas separation membrane, and excellent in gas separation performance is obtained.
[Solution] A gas separation membrane, including:
a polyimide that contains a repeating unit represented by general formula (1).

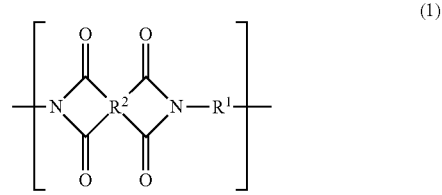

(1)

[In the formula (1), $R^1$ is a divalent organic group and $R^2$ is a tetravalent organic group, $R^1$ containing a 2-hydroxy-1,1,1,3,3,3-hexafluoroisopropyl group $(-C(CF_3)_2OH)$].

39 Claims, No Drawings

GAS SEPARATION MEMBRANE

TECHNICAL FIELD

The present invention relates to a gas separation membrane.

BACKGROUND OF THE INVENTION

From long ago, the separation of gas using a gas separation membrane has attracted attention as being a simple and facilitative technique capable of separating a mixture gas continuously while maintaining a gaseous state, the technique not involving a phase change. The separation of gas is a technique for selectively separating a gas with the aid of the presence or absence of permeation and the differences in permeation rate according to the kind of gas (hereinafter, sometimes referred to as gas) which is to permeate through a gas separation membrane.

As materials for the gas separation membrane, there have been known some polymers such as cellulose acetate, polysulfone, polyimide and the like. Of these, polyimide is known as a material having a strength suitable for being used for a gas separation membrane, resistant to breakage, and excellent in heat resistance so as to be usable at high temperatures.

Gas separation membranes using polyimide have variously been reported, in which the influence of the structure of a monomer on gas separation performances such as the permeability of the membrane for separating a target gas, the high selectivity of the target gas and the like is eagerly studied.

For example, it is known that a polyimide-based gas separation membrane containing a hexafluoroisopropylidene group (—C(CF$_3$)$_2$—) in a repeating structure have high permeability of helium (hereinafter, sometimes referred to as He) and carbon dioxide (hereinafter, sometimes described as CO$_2$) and therefore the selectivity of these gases against oxygen (hereinafter, sometimes described as O$_2$) and methane (hereinafter, sometimes referred to as CH$_4$) is highly exhibited.

Additionally, in producing a gas separation membrane by introducing a hexafluoroisopropylidene group (—C(CF$_3$)$_2$—) into a repeating unit of polyimide, it is said possible to weaken the intermolecular interaction while enhancing the rigidity of the chains to cause a difference in permeability of a gas separation membrane according to the kind of gas thereby accomplishing both a high membrane permeability and a high selectivity (see Non-Patent Publications 1 and 2).

However, materials for synthesizing a hexafluoroisopropylidene group-containing polyimide include only the following diamine and carboxylic dianhydride. These are limited in chemical structure when developed into a polyimide membrane, so that it is difficult to design a chemical structure with consideration paid to the strength and separation performance as observed in use as a gas separation membrane. Furthermore, there is a problem of limitation of organic solvents in which polyimide is soluble. Incidentally, the separation performance of a polyimide membrane containing a hexafluoroisopropylidene group, with regard to a mixture gas of He, CO$_2$, O$_2$ and CH$_4$ is discussed in Non-Patent Publication 3.

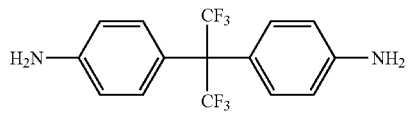

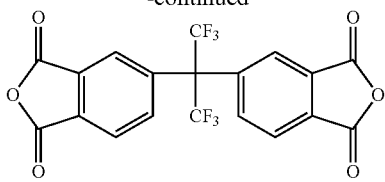

In Patent Publications 1 to 3, a fluorine-containing polymerizable monomer for polymerizing a fluorine-containing polyimide, which is a diamine having 2-hydroxy-1,1,1,3,3,3-fluoroisopropyl group (—C(CF$_3$)$_2$OH) (hereinafter, sometimes referred to as a HFIP group) is disclosed together with a method for producing the same.

As a method for producing a gas separation membrane formed containing polyimide and the like, there are known a method of obtaining a uniform membrane by applying a polyimide solution in a wet condition and then only by evaporating a solvent and a method of obtaining a nonuniform asymmetric membrane formed having a dense layer and a porous layer. The method of obtaining a nonuniform asymmetric membrane is exemplified by a method of discharging a polymer solution through an outlet and evaporating a solvent disposed in the vicinity of a surface in air to form a dense layer, in which method the surface is thereafter immersed in a coagulation bath charged with a coagulation liquid (which is a solvent compatible with the solvent for the polymer solution but not compatible with the polymer) thereby forming a finely porous layer in the coagulation bath. In Patent Publication 4, a method for producing a multilayer reverse osmosis membrane according to the above method is disclosed.

As discussed above, diamine and carboxylic dianhydride for polymerizing a hexafluoroisopropylidene group-containing polyimide are limited in chemical structure when developed into a polyimide membrane, as discussed above, so that it is difficult to design a chemical structure with consideration paid to the formability, strength and separation performance of a gas separation membrane.

REFERENCES ABOUT PRIOR ART

Patent Publication

Patent Publication 1: Japanese Patent Application Publication No. 2007-119503
Patent Publication 2: Japanese Patent Application Publication No. 2007-119504
Patent Publication 3: Japanese Patent Application Publication No. 2008-150534
Patent Publication 4: U.S. Pat. No. 3,133,132

Non-Patent Publication

Non-Patent Publication 1: Kenichi OKAMOTO et al., Polymer Application, Vol. 41, No. 1, pp. 16, 1992
Non-Patent Publication 2: S. A. Stern, Journal of Membrane Science, Vol. 94, pp. 1, 1994

SUMMARY OF THE INVENTION

Problems to be Solved by the Invention

An object of the present invention is to provide a gas separation membrane which can overcome the above-mentioned drawbacks, soluble in an organic solvent, readily formable and excellent in gas separation performance when used as a gas separation membrane.

Means for Solving the Problems

The present inventors employed a gas separation membrane having polyimide that contains a HFIP group (a polar group including OH group) to obtain a solubility in an organic solvent, and particularly a solubility in a polar solvent and improve the separation performance of gas, thereby having solved the above-mentioned problems.

A gas separation membrane of the present invention is a fluorine containing polyimide-based gas separation membrane that has a HFIP group.

More specifically, the present invention involves Inventions 1 to 19 as follows.

[Invention 1]

A gas separation membrane, comprising:

a polyimide that contains a repeating unit represented by general formula (1).

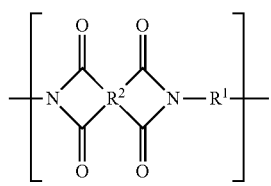
(1)

[In the formula (1), $R^1$ is a divalent organic group and $R^2$ is a tetravalent organic group, $R^1$ containing a 2-hydroxy-1,1,1,3,3,3-hexafluoroisopropyl group.]

[Invention 2]

A gas separation membrane as discussed in Invention 1, wherein $R^1$ is a divalent organic group represented by general formula (2).

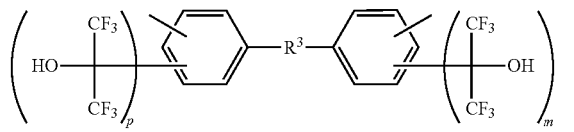
(2)

[In the formula (2), $R^3$ is a single bond, an oxygen atom, a sulfur atom, $SO_2$, $CH_2$, $CO$, $C(CH_3)_2$, $C(CH_3)(CH_2CH_3)$, $C(CF_3)_2$, or a divalent organic group formed by removing two hydrogen atoms from a $C_3$-$C_{12}$ alicyclic hydrocarbon or $C_6$-$C_{25}$ aromatic hydrocarbon. "m" and "p" mutually independently represent an integer of 0 to 2 such that $1 \leq m+p \leq 4$.]

[Invention 3]

A gas separation membrane as discussed in Invention 2, wherein the divalent organic group represented by the general formula (2) is a divalent organic group represented by formula (3).

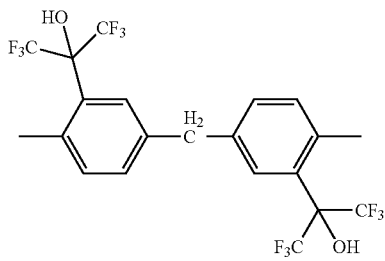
(3)

[Invention 4]

A gas separation membrane as discussed in Invention 2, wherein the divalent organic group represented by the general formula (2) is a divalent organic group represented by formula (4).

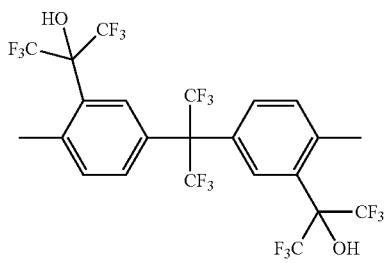
(4)

[Invention 5]

A gas separation membrane as discussed in Invention 2, wherein the divalent organic group represented by the general formula (2) is a divalent organic group represented by formula (5).

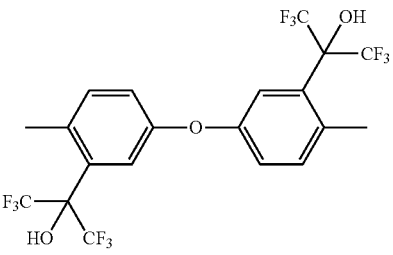
(5)

[Invention 6]

A gas separation membrane as discussed in Invention 2, wherein the divalent organic group represented by the general formula (2) is a divalent organic group represented by general formula (6).

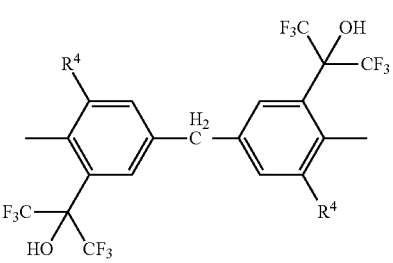
(6)

[In the formula (6), R⁴ mutually independently represents at least one kind of monovalent organic group selected from the group consisting of a $C_1$-$C_{10}$ alkyl group, alkoxyl group, carboxyl group, ester group, hydroxyl group, nitro group, cyano group, chloro group, bromo group and fluoroalkyl group.]

[Invention 7]

A gas separation membrane as discussed in Invention 6, wherein the divalent organic group represented by the general formula (2) is a divalent organic group represented by formula (7).

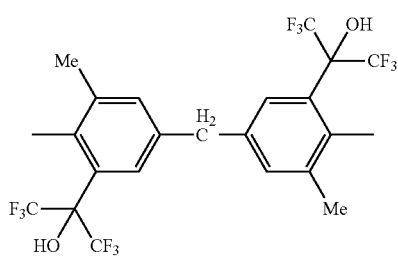

(7)

[In the formula (7), "Me" represents a methyl group.]

[Invention 8]

A gas separation membrane as discussed in Invention 2, wherein the divalent organic group represented by the general formula (2) is a divalent organic group represented by general formula (8).

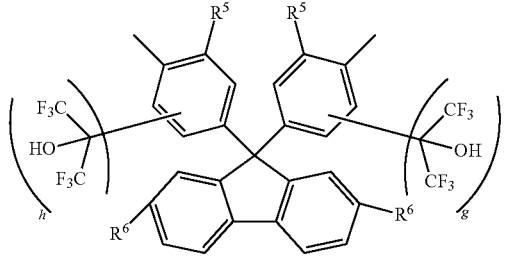

(8)

[In the formula (8), R⁵ mutually independently represents at least one kind of monovalent organic group selected from the group consisting of a hydrogen atom, methyl group, ethyl group, isopropyl group, chloro group, fluoro group, trifluoromethyl group, phenyl group, methoxy group and nitro group. R⁶ mutually independently represents at least one kind of monovalent organic group selected from the group consisting of a hydrogen atom, phenyl group, naphthyl group, biphenyl group, sulfo group, ethynylene structure-containing group, bromo group, chloro group, fluoro group and iodo group. "g" and "h" mutually independently represent any integer of 0, 1 and 2 and the total of "g" and "h" is not smaller than 1 and not larger than 4.]

[Invention 9]

A gas separation membrane as discussed in Invention 8, wherein the divalent organic group represented by the general formula (8) is a divalent organic group represented by formula (9).

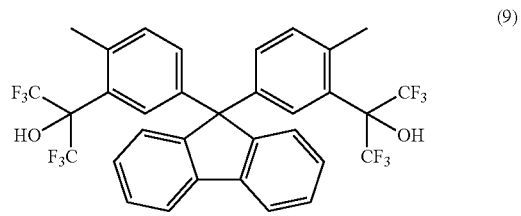

(9)

[Invention 10]

A gas separation membrane as discussed in Invention 1, wherein R¹ is a divalent organic group represented by general formula (10).

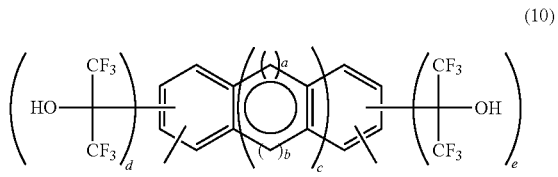

(10)

[In the formula (10), "a" and "b" mutually independently represent an integer of 0 to 2 such that a+b≥1. "c" is an integer of not smaller than 0 and not larger than 3. "d" and "e" mutually independently represent an integer of 0 to 2 such that 1≤d+e≤4. Additionally, a moiety is represented in the formula (10) by the following formula:

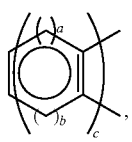

in which a carbon atom may be substituted with a hetero atom (a nitrogen atom, oxygen atom or sulfur atom), a hydrogen atom may be substituted with a substituent, and the substituent may contain a nitrogen atom, oxygen atom or sulfur atom.]

[Invention 11]

A gas separation membrane as discussed in Invention 10, wherein the divalent organic group represented by the general formula (10) is a divalent organic group represented by formula (11).

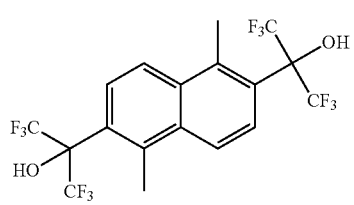

(11)

[Invention 12]

A gas separation membrane as discussed in Invention 1, wherein the divalent organic group represented by R¹ is a divalent organic group represented by general formula (12).

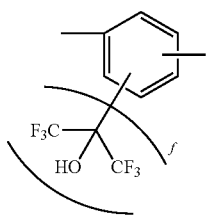

(12)

[In the formula (12), "f" is an integer of 1 or 2.]

[Invention 13]

A gas separation membrane as discussed in Invention 12, wherein the divalent organic group represented by the general formula (12) is a divalent organic group represented by formula (13).

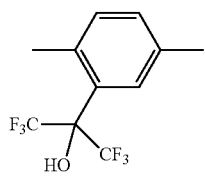

(13)

[Invention 14]

A gas separation membrane as discussed in Invention 12, wherein the divalent organic group represented by the general formula (12) is a divalent organic group represented by formula (14).

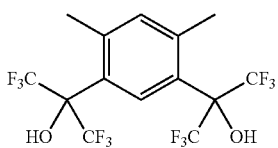

(14)

[Invention 15]

A gas separation membrane as discussed in any one of Inventions 1 to 4, wherein the tetravalent organic group represented by $R^2$ is a tetravalent organic group represented by formula (15).

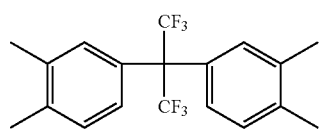

(15)

[Invention 16]

A gas separation membrane as discussed in any one of Inventions 1 to 15, wherein a hydrogen atom of OH group that 2-hydroxy-1,1,1,3,3,3-hexafluoroisopropyl group contained in $R^1$ has is substituted with a glycidyl group.

[Invention 17]

A gas separation membrane as discussed in Invention 16, wherein the glycidyl group forms crosslinking in a manner that its cyclic ether moiety is opened.

[Invention 18]

A gas separation membrane as discussed in any one of Inventions 1 to 16, obtained by being mixed with an epoxy compound and then heated.

[Invention 19]

A gas separation membrane as discussed in Invention 18, wherein the epoxy compound is represented by the general formula (16).

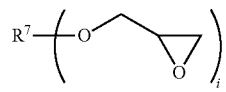

(16)

[In the formula (16), $R^7$ is a monovalent organic group formed by removing one hydrogen atom from an alkane, aromatic compound or alicyclic compound and may contain an oxygen atom, sulfur atom or nitrogen atom in its structure, wherein a part of hydrogen atoms may be substituted with fluorine atom, chlorine atom, alkyl group or fluoroalkyl group. "i" is an integer of 1 to 4.]

Effects of the Invention

A HFIP group-containing polyimide-based gas separation membrane of the present invention exhibits an excellent separation performance derived from the HFIP group. A gas separation membrane containing a hexafluoroisopropylidene group in addition to the HFIP group exhibits a more excellent gas separation performance. The HFIP group has a hydroxyl group and therefore soluble in a specified organic solvent, and more particularly soluble in a polar solvent, so that it is possible to prepare a polyimide solution and form it into a shape of a desired membrane.

Moreover, in a HFIP group-containing polyimide-based gas separation membrane of the present invention, an aromatic diamine provided as the starting material is allowed to contain a HFIP group (see Patent Publications 1 to 3). With this, it becomes possible to design a structure superior to conventional fluorine-containing polyimide-based gas separation membrane not only in gas separation performance but also in membrane properties (e.g. the membrane strength and the swelling resistance in a solvent).

MODE(S) FOR CARRYING OUT THE INVENTION

A monomer that serves as the starting material of a HFIP group-containing polyimide, for producing a gas separation membrane of the present invention, is exemplified by a HFIP group-containing diamine and a tetracarboxylic dianhydride. In order to ensure the strength of the gas separation membrane, it is preferable to adopt an aromatic diamine. In addition to a HFIP group-containing aromatic diamine, it is also possible to add another diamine in order to adjust the strength and the separation performance of the membrane. Likely, for the purpose of adjusting the strength and the separation performance of the membrane, it is also possible to add another dicarboxylic acid or derivative thereof in addition to tetracarboxylic dianhydride.

1. HFIP Group-Containing Aromatic Diamine

A HFIP group-containing aromatic diamine, which serves as a monomer for synthesizing a HFIP group-containing polyimide for producing a gas separation membrane of the present invention, is represented by the following general formulas (2A) to (14A).

[Diamine Represented by General Formula (2A)]

A gas separation membrane as in claim 1, which is a divalent organic group represented by:

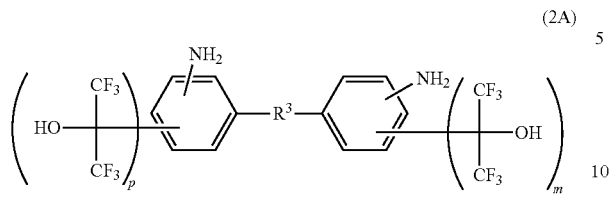

(2A)

[In the formula (2A), $R^3$ is a single bond, an oxygen atom, a sulfur atom, $SO_2$, $CH_2$, $CO$, $C(CH_3)_2$, $C(CH_3)(CH_2CH_3)$, $C(CF_3)_2$, or a divalent organic group formed by removing two hydrogen atoms from a $C_3$-$C_{12}$ alicyclic hydrocarbon or $C_6$-$C_{25}$ aromatic hydrocarbon. "m" and "p" mutually independently represent an integer of 0 to 2 such that $1 \leq m+p \leq 4$.]

A divalent organic group formed by removing two hydrogen atoms from a $C_3$-$C_{12}$ alicyclic hydrocarbon is preferably exemplified by a divalent organic group formed by removing two hydrogen atoms from cyclohexane, bicyclohexane, adamantine or norbornane. A divalent organic group formed by removing two hydrogen atoms from a $C_6$-$C_{25}$ aromatic hydrocarbon is exemplified by a divalent organic group formed by removing two hydrogen atoms from benzene, biphenyl, naphthalene or fluorene.

[Diamine Represented by Formula (3A)]

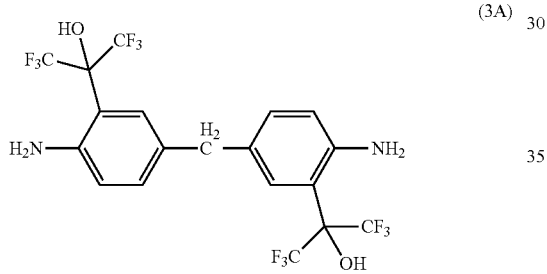

(3A)

[Diamine Represented by Formula (4A)]

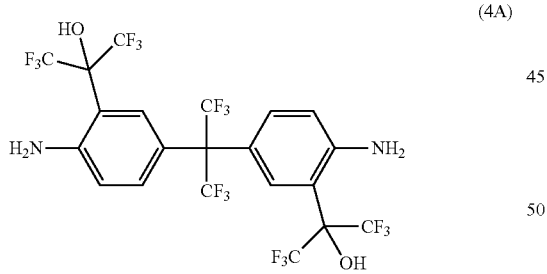

(4A)

[Diamine Represented by Formula (5A)]

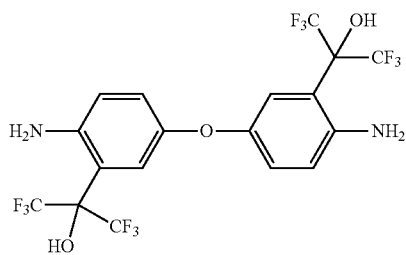

(5A)

[Diamine Represented by General Formula (6A)]

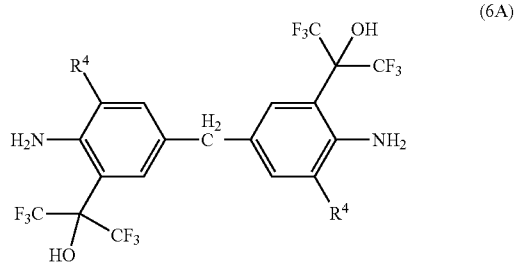

(6A)

[In the general formula (6A), $R^4$ mutually independently represents at least one kind of monovalent organic group selected from the group consisting of a $C_1$-$C_{10}$ alkyl group, alkoxyl group, carboxyl group, ester group, hydroxyl group, nitro group, cyano group, chloro group, bromo group and fluoroalkyl group.]

[Diamine Represented by Formula (7A)]

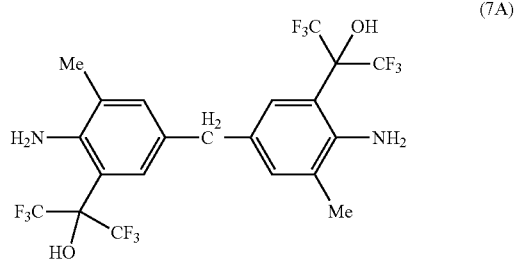 [SMILES: Cc1cc(Cc2cc(C)c(N)c(C(O)(C(F)(F)F)C(F)(F)F)c2)cc(C(O)(C(F)(F)F)C(F)(F)F)c1N]

(7A)

[In the formula, "Me" represents a methyl group.]

[Diamine Represented by General Formula (8A)]

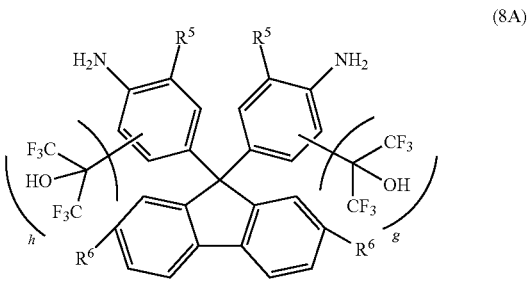

(8A)

[In the general formula (8A), $R^5$ mutually independently represents at least one kind of monovalent organic group selected from the group consisting of a hydrogen atom, methyl group, ethyl group, isopropyl group, chloro group, fluoro group, trifluoromethyl group, phenyl group, methoxy group and nitro group. $R^6$ mutually independently represents at least one kind of monovalent organic group selected from the group consisting of a hydrogen atom, phenyl group, naphthyl group, biphenyl group, sulfo group, ethynylene structure-containing group, bromo group, chloro group, fluoro group and iodo group. "g" and "h" mutually independently represent any integer of 0, 1 and 2 and the total of "g" and "h" is not smaller than 1 and not larger than 4.]

[Diamine Represented by Formula (9A)]

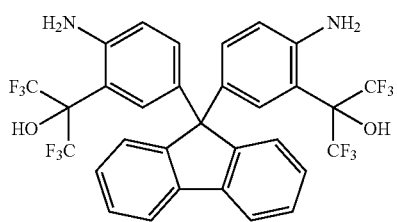

(9A)

[Diamine Represented by Formula (10A)]

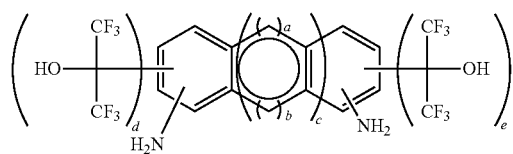

(10A)

[In the formula (10A), "a" and "b" mutually independently represent an integer of 0 to 2 such that a+b≤1. "c" is an integer of not smaller than 0. "d" and "e" mutually independently represent an integer of 0 to 2 such that 1≤d+e≤4. Additionally, a moiety is represented in the formula (10A) by the following formula:

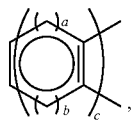

in which a carbon atom may be substituted with a hetero atom (a nitrogen atom, oxygen atom or sulfur atom), a hydrogen atom may be substituted with a substituent, and the substituent may contain a nitrogen atom, oxygen atom or sulfur atom.]

[Diamine Represented by Formula (11A)]

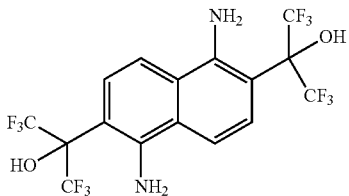

(11A)

[Diamine Represented by General Formula (12A)]

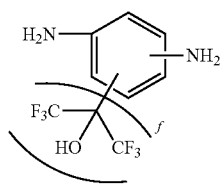

(12A)

[In the general formula (12A), "f" is an integer of 1 or 2.]

[Diamine Represented by Formula (13A)]

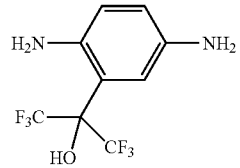

(13A)

[Diamine Represented by Formula (14A)]

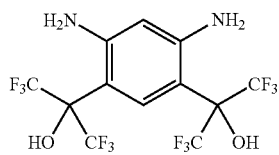

(14A)

Incidentally, in a HFIP group-containing polyimide, a HFIP group-containing aromatic diamine represented by general formula (2A) provides a repeating unit having a structural unit represented by general formula (2). Similarly, diamines represented by formulas (3A) to (14A) provide repeating units having structural units represented by general formulas (3) to (14), respectively.

Of the HFIP group-containing aromatic diamines represented by formulas (2A) to (14A), diamine represented by formula (3A), (4A), (5A), (6A), (7A), (11A), (13A) or (14A) is easily synthesized so as to serve as a reasonably usable starting material in the HFIP group-containing polyimide-based gas separation membrane of the present invention. These HFIP group-containing aromatic diamines may be used in combination of two or more kinds. Methods for producing them are discussed in Patent Publications 1 to 3.

2. Another Diamine

In the gas separation membrane of the present invention, another diamine such as dihydroxyamine may be used in addition to the HFIP group-containing aromatic diamine in synthesis of a HFIP group-containing polyimide, for the purpose of adjusting membrane properties such as gas separation performance and membrane strength of the gas separation membrane. The amount to be used is 10 to 80 mol %, preferably 30 to 60 mol % relative to the tetracarboxylic dianhydride. With this, it becomes possible to adjust various performances such as gas separation performance, solubility in a polar solvent, membrane strength and the like.

Diamine is exemplified by 3,5-diaminobenzotrifluoride, 2,5-diaminobenzotrifluoride, 3,3'-bistrifluoromethyl-4,4'-diaminobiphenyl, 3,3'-bistrifluoromethyl-5,5'-diaminobiphenyl, bis(trifluoromethyl)-4,4'-diaminodiphenyl, bis(fluoroalkyl)-4,4'-diaminodiphenyl, dichloro-4,4'-diaminodiphenyl, dibromo-4,4'-diaminodiphenyl, bis(fluoroalkoxy)-4,4'-diaminodiphenyl, diphenyl-4,4'-diaminodiphenyl, 4,4'-bis(4-aminotetrafluorophenoxy) tetrafluorobenzene, 4,4'-bis(4-aminotetrafluorophenoxy) octafluorobiphenyl, 4,4'-binaphthylamine, o-phenylenediamine, m-phenylenediamine, p-phenylenediamine, 2,4-diaminotoluene, 2,5-diaminotoluene, 2,4-diaminoxylene, 2,4-diaminodurene, 1,4-xylylenediamine, dimethyl-4,4'-diaminodiphenyl, dialkyl-4,4'-diaminodiphenyl, dimethoxy-4,4'-diaminodiphenyl, diethoxy-4,4'-diaminodiphenyl, 4,4'-diaminodiphenylmethane, 3,3'-dimethyl-diaminodiphenylmethane, 3,3'-diethyl-diaminodiphenylmethane, 9,9-bis(4-aminophenyl)fluorene, 4,4'-diaminodiphenylether, 3,4'-diaminodiphenylether, 4,4'-diaminodiphenylsulfide, 3,4'-diaminodiphenylsulfide, 4,4'-diaminodiphenylsulfone, 3,3'-diaminodiphenylsulfone, 4,4'-diaminobenzophenone, 3,3'-diaminobenzphenone, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, bis(4-(3-aminophenoxy)phenyl)sulfone, bis(4-(4-aminophenoxy)phenyl)sulfone, 2,2-bis(4-(4-aminophenoxy)phenyl)propane, 2,2-bis(4-(4-aminophenoxy)phenyl)hexafluoropropane, 2,2-bis(4-(3-aminophenoxy)phenyl)propane, 2,2-bis(4-(3-aminophenoxy)phenyl)hexafluoropropane, 2,2-bis(4-(4-amino-2-trifluoromethylphenoxy)phenyl)hexafluoropropane, 2,2-bis(4-(3-amino-5-trifluoromethylphenoxy)phenyl)hexafluoropropane, 2,2-bis(4-aminophenyl)hexafluoropropane, 2,2-bis(3-aminophenyl)hexafluoropropane, 2,2-bis(3-amino-4-hydroxyphenyl)hexafluoropropane, 2,2-bis(3-amino-4-methylphenyl)hexafluoropropane, 4,4'-bis(4-aminophenoxy)octafluorobiphenyl or 4,4'-diaminobenzanilide. Two or more kinds of these may be used in combination, in which case the composition is provided to be a copolymerized one modified with polybenzoxazole.

Moreover, it is also possible to add a diamine containing a hexafluoroisopropylidene group and represented by the following structural formula.

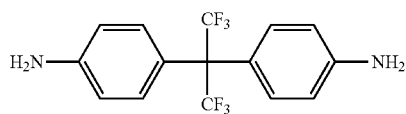

3. Tetracarboxylic Dianhydride

Tetracarboxylic dianhydride, which is used to synthesize a HFIP group-containing polyimide for producing a gas separation membrane of the present invention, is represented by general formula (17).

[Tetracarboxylic Dianhydride Represented by General Formula (17)]

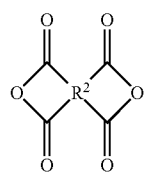

(17)

[In the formula (17), $R^2$ represents an organic group and preferably a tetravalent organic group formed by substituting four hydrogen atoms of alkane or an alicyclic or aromatic compound and may contain a fluorine atom, chlorine atom, oxygen atom, sulfur atom or nitrogen atom in its structure, wherein a part of hydrogen atoms may be substituted with alkyl group, fluoroalkyl group, carboxyl group, hydroxyl group or cyano group.]

As the above-mentioned tetracarboxylic dianhydride, it is possible to cite benzenetetracarboxylic dianhydride (pyromellitic dianhydride) (hereinafter, abbreviated as PMDA), trifluoromethylbenzenetetracarboxylic dianhydride, bistrifluoromethylbenzenetetracarboxylic dianhydride, difluorobenzenetetracarboxylic dianhydride, naphthalenetetracarboxylic dianhydride, biphenyltetracarboxylic dianhydride (hereinafter, abbreviated as BPDA), terphenyltetracarboxylic dianhydride, 1,1-bis(3,4-dicarboxyphenyl)ketone acid dianhydride (hereinafter, abbreviated as BTDA), oxydiphthalic dianhydride, bicycle [2,2,2]oct-7-ene-2,3,5,6-tetracarboxylic dianhydride, 2,2-bis(3,4-dicarboxyphenyl)hexafluoropropionic dianhydride (hereinafter, abbreviated as 6FDA), 2,3,4,5-thiophenetetracarboxylic dianhydride, 2,5,6,2',5',6'-hexafluoro-3,3',4,4'-biphenyltetracarboxylic dianhydride, bis(3,4-dicarboxyphenyl)sulfonic dianhydride and 3,4,9,10-perylenetetracarboxylic dianhydride. These may be used in combination of two or more kinds and not particularly limited.

Of these, PMDA, BPDA, BTDA, and 6FDA are preferably adopted in view of availability, and more specifically, 6FDA excellent in gas separation performance (permeability and selectivity) is particularly preferable.

[6FDA]

6FDA is a compound represented by the following structural formula. By introducing a hexafluoroisopropylidene group ($—C(CF_3)_2—$) into the structure, there is obtained a repeating unit containing a structural unit represented by the formula (15), the repeating unit providing, when developed into polyimide, a gas separation membrane that exhibits a high membrane permeability and a high selectivity against a gas to be separated.

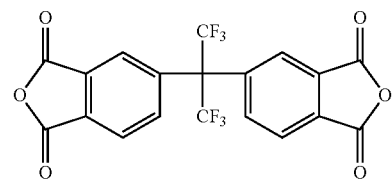

These tetracarboxylic dianhydrides may be used singly or in combination of two or more kinds.

4. Dicarboxylic Acid Derivative

In order to adjust membrane properties for a gas separation membrane, such as separation performance, strength and the like, it is also possible to use a dicarboxylic acid derivative represented by general formula (9) or (10) in addition to the above-mentioned tetracarboxylic dianhydride. The amount to be used is not lower than 10 mol % and not more than 80 mol %, preferably not lower than 30 mol % and 60 mol % relative to the tetracarboxylic dianhydride. Within this mole ratio range, adjustments of the gas separation performance, the solubility in a polar solvent and the membrane strength are allowed.

General Formula (18)

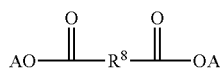

(18)

[In the formula (18), $R^8$ represents an organic group and preferably a divalent organic group formed by removing two hydrogen atoms from alkane or an alicyclic or aromatic compound and may contain an oxygen atom or sulfur atom in its structure, wherein a part of hydrogen atoms may be substituted with alkyl group, fluorine, chlorine, fluoroalkyl group, carboxyl group, hydroxyl group or cyano group. "A" mutually independently represents a hydrogen atom, $C_1$-$C_{10}$ alkyl group or benzyl group.]

General Formula (19)

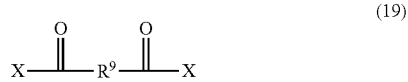

[In the formula (19), $R^9$ represents an organic group and preferably an alkylene group or a divalent organic group formed by removing one hydrogen atom from an alicyclic or aromatic compound and may contain an oxygen atom, sulfur atom or nitrogen atom in its structure, wherein a part of hydrogen atoms may be substituted with alkyl group, fluorine, chlorine, fluoroalkyl group, carboxyl group, hydroxyl group or cyano group. "X" mutually independently represents a chlorine atom, fluorine atom, bromine atom or iodo atom.]

After condensation reaction, there is provided a structural unit containing a heterocyclic structure represented by general formula (20) as a copolymerized component.

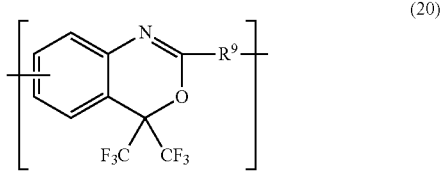

A dicarboxylic acid derivative represented by general formula (18) or (19), for synthesizing a fluorine-containing polyimide used for producing a gas separation membrane of the present invention, can be exemplified in the form of dicarboxylic acid as the starting material by: aliphatic dicarboxylic acids such as oxalic acid, malonic acid, succinic acid, glutaric acid, adipic acid, pimelic acid, suberic acid, azelaic acid and sebacic acid: aromatic carboxylic acids such as phthalic acid, isophthalic acid, terephthalic acid, 3,3'-dicarboxydiphenyl ether, 3,4'-dicarboxydiphenyl ether, 4,4'-dicarboxydiphenyl ether, 3,3'-dicarboxydiphenylmethane, 3,4'-dicarboxydiphenylmethane, 4,4'-dicarboxydiphenylmethane, 3,3'-dicarboxydiphenyldifluoromethane, 3,4'-dicarboxydiphenyldifluoromethane, 4,4'-dicarboxydiphenyldifluoromethane, 3,3'-dicarboxydiphenylsulfone, 3,4'-dicarboxydiphenylsulfone, 4,4'-dicarboxydiphenylsulfone, 3,3'-dicarboxydiphenylsulfide, 3,4'-dicarboxydiphenylsulfide, 4,4'-dicarboxydiphenylsulfide, 3,3'-dicarboxydiphenylketone, 3,4'-dicarboxydiphenylketone, 4,4'-dicarboxydiphenylketone, 2,2-bis(3-carboxyphenyl)propane, 2,2-bis(3,4'-dicarboxyphenyl)propane, 2,2-bis(4-carboxyphenyl)propane, 2,2-bis(3-carboxyphenyl)hexafluoropropane, 2,2-bis(3,4'-dicarboxyphenyl)hexafluoropropane, 2,2-bis(4-carboxyphenyl)hexafluoropropane, 1,3-bis(3-carboxyphenoxy)benzene, 1,4-bis(3-carboxyphenoxy)benzene, 1,4-bis(4-carboxyphenoxy)benzene, 3,3'-(1,4-phenylenebis(1-methylethylidene))bisbenzoic acid, 3,4-(1,4-phenylenebis(1-methylethylidene))bisbenzoic acid, 4,4'-(1,4-phenylenebis(1-methylethylidene))bisbenzoic acid, 2,2-bis(4-(3-carboxyphenoxy)phenyl)propane, 2,2-bis(4-(4-carboxyphenoxy)phenyl)propane, 2,2-bis(4-(3-carboxyphenoxy)phenyl)hexafluoropropane, 2,2-bis(4-(4-carboxyphenoxy)phenyl)hexafluoropropane, bis(4-(3-carboxyphenoxy)phenyl)sulfide, bis(4-(4-carboxyphenoxy)phenyl)sulfide, bis(4-(3-carboxyphenoxy)phenyl)sulfone and bis(4-(4-carboxyphenoxy)phenyl)sulfone; perfluorononenyloxy group-containing dicarboxylic acids such as 5-(perfluorononenyloxy)isophthalic acid, 4-(perfluorononenyloxy)phthalic acid, 2-(perfluorononenyloxy)terephthalic acid and 4-methoxy-5-(perfluorononenyloxy)isophthalic acid; and perfluorohexenyloxy group-containing dicarboxylic acids such as 5-(perfluorohexenyloxy)isophthalic acid, 4-(perfluorohexenyloxy)phthalic acid, 2-(perfluorohexenyloxy)terephthalic acid and 4-methoxy-5-(perfluorohexenyloxy)isophthalic acid. These may be used in combination of two or more kinds.

5. Synthesis of HFIP Group-Containing Polyimide

A condensation reaction caused at the time of synthesizing a HFIP group-containing polyimide used for a gas separation membrane of the present invention will be discussed.

As a method for synthesizing a HFIP group-containing polyimide used for a gas separation membrane of the present invention, it is possible to cite methods absolutely requiring the HFIP group-containing aromatic diamine and tetracarboxylic dianhydride, in which methods another diamine and a dicarboxylic acid derivative may be added as needed and then these are dissolved in each other at 150° C. or more with no solvent to be reacted or these are brought into condensation reaction at a reaction temperature of −20 to 80° C. in the presence of an organic solvent. In polycondensation reaction, it is preferable to react diamine with carboxylic dianhydride or dicarboxylic acid at a mole ratio of 1:1 such that the abundance ratio of a HFIP group-containing aromatic diamine and another diamine to tetracarboxylic dianhydride and dicarboxylic acid derivative falls at a mole ratio (aromatic diamine and another diamine tetracarboxylic dianhydride and dicarboxylic acid derivative) of 1:1.

An organic solvent usable in the above-mentioned condensation reaction is required only to be one that can dissolve the starting material compounds (a HFIP group-containing aromatic diamine and tetracarboxylic dianhydride), another diamine and dicarboxylic acid derivative, and therefore exemplified by: amide-based solvents such as N,N-dimethylformamide, N,N-dimethylacetamide, hexamethylphosphoric triamide and N-methyl-2-pyrrolidone; aromatic solvents such as benzene, anisole, diphenyl ether, nitrobenzene and benzonitrile; halogen-based solvents such as chloroform, dichloromethane, 1,2-dichloroethane and 1,1,2,2-tetrachloroethane; and lactones such as γ-butyrolactone, γ-valerolactone, δ-valerolactone, γ-caprolactone, ε-caprolactone and α-methyl-γ-butyrolactone. These organic solvents may coexist with an acid acceptor (e.g., pyridine and triethylamine) thereby cause polycondensation reaction.

In polycondensation reaction, a HFIP group-containing polyamic acid previously obtained by polymerization reaction is brought into a dehydration cyclization reaction to form imide thereby achieving the conversion into the target compound (a HFIP group-containing polyimide).

The dehydration cyclization reaction is conducted under such a reaction condition (including a heating condition, use of an acid catalyst and the like) as to accelerate the cyclization. In general, a solution of a HFIP group-containing polyamic acid, obtained immediately after polymerization reaction is imidized at a high temperature of not lower than 150° C. and not higher than 250° C. thereby preparing a solution of a HFIP group-containing polyimide. At this time, pyridine, triethylamine, acetic anhydride or the like may be added thereto. The concentration of the HFIP group-containing polyimide in the solution is preferably not smaller than 5 mass % and not larger than 50 mass %. When the concentration is smaller than 5 mass %, the HFIP group-containing polyimide is so poor as not to be industrially practical. Meanwhile, a HFIP group-containing polyimide of larger than 50 mass % is difficult to be dissolved. The concentration is more preferably not smaller than 10 mass % and not larger than 40 mass %.

6. Preparation of Solution of HFIP Group-Containing Polyimide

The thus obtained solution of a HFIP group-containing polyimide may be used for production of a gas separation membrane as it is. Additionally, for the purpose of removing a remaining monomer or oligomer contained in the solution of a HFIP group-containing polyimide, the solution of a HFIP group-containing polyimide may be added to a poor solvent such as water and alcohol to be precipitated and subjected to isolation purification and then dissolved in an organic solvent again thereby being prepared to have the above-mentioned concentration.

A usable organic solvent is required only to dissolve a HFIP group-containing polyimide therein, so that it is possible to use one selected from: amide-based solvents such as N,N-dimethylformamide, N,N-dimethylacetamide, N,N-dimethylformamide, hexamethylphosphoric triamide and N-methyl-2-pyrrolidone; aromatic solvents such as benzene, anisole, diphenyl ether, nitrobenzene and benzonitrile; halogen-based solvents such as chloroform, dichloromethane, 1,2-dichloroethane and 1,1,2,2-tetrachloroethane; lactones such as γ-butyrolactone, γ-valerolactone, δ-valerolactone, γ-caprolactone, ε-caprolactone and α-methyl-γ-butyrolactone; phenols such as phenol, cresol, xylenol, catechol and chlorophenol; and mixture solvents of these.

7. Production of Gas Separation Membrane

A gas separation membrane formed from a HFIP group-containing polyimide, according to the present invention may be either a uniform membrane obtained by a wet film forming method where a thin membrane is produced with the aid of the property of a solvent evaporating from a HFIP group-containing polyimide solution, or an asymmetric membrane obtained by other method to have a dense layer and a porous layer.

A uniform membrane is obtained in such a manner as to apply the HFIP group-containing polyimide solution to a substrate (a glass substrate or the like) by a spin coater, applicator or the like in a wet condition and then heat the substrate in a dried gas such as air, nitrogen and argon to evaporate a solvent and then peel a membrane from the substrate. The uniform membrane can be obtained also by using a HFIP group-containing polyamic acid solution instead of the HFIP group-containing polyimide solution, in which method the polyamic acid solution is applied to a substrate according to the above-mentioned procedures and then heated to be imidized. For using the uniform membrane as a gas separation membrane, the thickness is preferably not less than 5 μm and not more than 1 mm. A membrane of 5 μm or less thickness is difficult to be manufactured and easily broken. A membrane of 1 mm or more thickness has difficulty in permeating gases. The thickness is more preferably 10 to 200 μm.

The asymmetric membrane formed having a dense layer and a porous layer can be formed by the above-mentioned method. Additionally, the asymmetric membrane can be obtained also by using a polyamic acid solution instead of the polyimide solution, in which an asymmetric membrane is formed and then heated to be imidized.

In the asymmetric membrane, the dense layer has different permeation rates according to the kind of gas so as to exhibit a selective gas separation function against a mixture gas. On the other hand, the porous layer functions as a support member for maintaining the shape of the membrane.

An asymmetric membrane to be used as the gas separation membrane of the present invention and formed including a HFIP group-containing polyimide may have either a smooth shape or a hollow fiber shape.

A dense layer preferably has a thickness of not less than 10 nm and not more than 10 μm. When the thickness is less than 10 nm, the layer is difficult to be formed and therefore not practical. When the thickness is more than 10 μm, permeation of gas becomes difficult. The thickness is more preferably not less than 30 nm and not more than 1 μm.

A porous layer having the shape of a smooth layer preferably has a thickness of 5 μm and not more than 2 mm. When the thickness is less than 5 μm, the layer is difficult to be formed and therefore not practical. When the thickness is more than 2 mm, permeation of gas becomes difficult. The thickness is more preferably not less than 10 μm and not more than 500 μm. In the case of the shape of hollow fiber, the internal diameter is not less than 10 μm and not more than 4 mm, preferably not less than 20 μm and not more than 1 mm. The outer diameter is not less than 30 μm and not more than 8 mm, preferably not less than 50 μm and not more than 1.5 mm. In the case of the shape of hollow fiber, it is preferable that the dense layer is disposed outside. A hollow fiber having an internal diameter of less than 10 μm and an outer diameter of less than 30 μm is difficult to be manufactured. A hollow fiber having an internal diameter of more than 1 mm and an outer diameter of more than 8 mm cannot practically be used as the gas separation membrane.

As a coagulation liquid used at the time of producing the asymmetric membrane, water or a mixture solvent of water and an organic solvent is preferably used. The mixture solvent contains water in an amount of 40 mass % or more, preferably 50 mass % or more. The organic solvent is exemplified by alcohols such as methanol, ethanol and isopropanol and ketones such as acetone, methyl ethyl ketone and diethyl ketone. If water or a water mixture solvent is used as a coagulation liquid, the manufacturing facility is not required to be exprosion-proof one and therefore results in cost reduction.

A HFIP group-containing polyimide used for the gas separation membrane of the present invention is particularly easily dissolved in amide-based solvents such as N,N-dimethylacetamide, N,N-dimethylformamide, and N-methyl-2-pyrrolidone and lactones such as γ-butyrolactone and γ-valerolactone, in which case it is easy to produce a uniform membrane having a desired thickness and it is easy to produce an asymmetric membrane in which a water-based coagulation liquid is used.

Particularly, in manufacturing an asymmetric membrane, a desired dense layer can be produced by changing the distance between an outlet and a coagulation bath (or by simultaneously discharging a dried air, a water-based coagulation liquid or the like into the inside of the outlet, in the case of discharging the polymer into the shape of hollow fiber). By modifying the kind of the organic solvent in the coagulation bath, it becomes possible to form a porous layer having desired pore diameter, pore distribution and thickness.

A membrane treated with a coagulation liquid is preferably used after being dried by heat treatment. The temperature of heat treatment is preferably not higher than the glass transition temperature of polyimide in order not to cause melting.

For the purpose of repairing surface defects on the produced gas separation membrane, a silicone resin may be coated on the surface of the separation membrane. As a coating method, known coating methods such as spin coating, coating by an applicator, immersion coating and the like are usable.

A silicone resin is exemplified by generally known ones such as dimethyl silicone, a phenyl group-containing silicone, a vinyl group-containing silicone, a Si—H group-containing silicone, a trifluoropropyl group-containing silicone, a silanol group-containing silicone, an amino group-containing silicone, an epoxy group-containing silicone, a methacrylic groups-containing silicone, an acrylic group-containing silicone and the like. These are commercially available and exemplified by DMS series, PDV series, VDT series, series, FMV series, HMS series, DMS series, HPM series, FMS series, SQO series, AMS series, MCR series, ECMS series, RMS series and the like available from Gelest, Inc.

8. Combined Use of Epoxy Compound

A polymer containing a repeating unit represented by the general formula (1) may be mixed with an epoxy compound and then heated or irradiated with light to be cured thereby serving as a cured membrane, for the purpose of improving the mechanical strength and the plasticization resistance, as the gas separation membrane discussed in Inventions 17 and 18. The cured membrane can be applied to the above-mentioned uniform membrane and asymmetric membrane.

As an epoxy compound, it is possible to cite epoxy compounds obtained by bringing phenol novolac resin, cresol novolac resin, aromatic hydrocarbon formaldehyde resin-modified phenol resin, dicyclopentadiene-modified phenol resin, phenolaralkyl resin, cresolaralkyl resin, naphtholaralkyl resin, biphenyl-modified phenolaralkyl resin, phenol trimethylolmethane resin, tetraphenylolethane resin, naphthol novolac resin, naphthol-phenol co-condensation novolac resin, naphthol-cresol co-condensation novolac resin, biphenyl-modified phenol resin, biphenyl-modified naphthol resins or aminotriazine-modified phenol resin into contact with epichlorohydrin thereby modifying them with epoxy group.

These are commercially available and exemplified by a bisphenol A type epoxy resin available from DIC Corporation under the trade name of Epiclon 840, a bisphenol F type epoxy resin available from ADEKA Corporation under the trade name of Adekaresin EP-4901, cresol novolac type epoxy resins available from DIC Corporation under the trade name of Epiclon N-600 series, dicyclopentadiene type resin available from DIC Corporation under the trade name of Epiclon HP-7200 series, triazine type resins available from Nissan Chemical Industries, Ltd. under the trade name of TEPIC series and the like.

Incidentally, an epoxy compound represented by formula (16) is synthesized from a corresponding alcohol and epichlorohydrin.

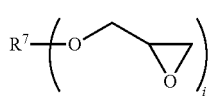
(16)

[In the formula (16), $R^7$ is an alkyl group or a monovalent organic group formed by removing one hydrogen atom from an aromatic compound or alicyclic compound, and may contain an oxygen atom, sulfur atom or nitrogen atom in its structure, wherein a part of hydrogen atoms may be substituted with fluorine atom, chlorine atom, alkyl group or fluoroalkyl group. "i" is an integer of 1 to 4.]

The alcohol is exemplified by 1,4-cyclohexanediol, 1,3-adamantanediol, catechol, 3-benzenediol, 2,2'-dihydroxybiphenyl, 4,4'-dihydroxybiphenyl, 2,2'-methylenediphenol, 4,4'-methylenediphenol, ethylene glycol, propylene glycol, 2,2-bis(4-hydroxyphenyl)-propane, 2,2-bis(4-hydroxyphenyl)-3-methylpropane, 2,2-bis(4-hydroxyphenyl)-butane, 3,3-bis(4-hydroxyphenyl)-pentane, 2,2-bis(4-hydroxyphenyl)-4-methylpentane, 3,3-bis(4-hydroxyphenyl)-hexane, 2,2-bis(3-chloro-4-hydroxyphenyl)-propane, 2,2-bis(3,5-dichloro-4-hydroxyphenyl)-propane, 2,2-bis(3-bromo-4-hydroxyphenyl)-propane, 2,2-bis(3,5-dibromo-4-hydroxyphenyl)-propane, 2,2-bis(3-methyl-4-hydroxyphenyl)-propane, 2,2-bis(4-hydroxyphenyl)-1,1,1,3,3,3-hexafluoropropane, 2,6-dihydroxynaphthalene, 2,3-dihydroxynaphthalene, 2,7-dihydroxynaphthalene, 1,4-dihydroxynaphthalene, 1,5-dihydroxynaphthalene, 2,3-dihydroxypyridine, 2,4-dihydroxypyridine, 4,4'-dihydroxydiphenyl ether, 4,4'-dihydroxydiphenyl sulfide, 4,4'-dihydroxydiphenyl sulfoxide, 4,4'-dihydroxydiphenyl sulfone, 4,4'-dihydroxybenzophenone, 1,4-dihydroxy hexane, 2,2-bis(4-hydroxycyclohexyl)-propane, 1,1'-methylenedi-2-naphthol, 4,4',4'-trihydroxytriphenylmethane, 1,1,1-tris(4 hydroxyphenyl) ethane and α,α,α'-tris(4-hydroxyphenyl)-1-ethyl-4-isopropylbenzene.

As the alcohol, it is also possible to use alcohol of a HFIP group contained in a repeating unit represented by formula (1).

At the time of producing a gas separation membrane of Inventions 17 to 19, these epoxy compounds may be used in combination with a curing agent for epoxy resin. The curing agent is exemplified by amine-based compounds, acid anhydride-based compounds, amide-based compounds, phenol-based compounds, mercaptan-based compounds, imidazole-based compounds, polysulfide resin-based compounds and phosphorous-based compounds. More specifically, it is possible to cite: heat curing agents such as diaminodiphenylmethane, diaminodiphenyl sulfone, diethylenetriamine, triethylenetetramine, polyalkylene glycol polyamine, phthalic anhydride, trimellitic anhydride, pyromellitic anhydride, maleic anhydride, tetrahydrophthalic anhydride, methyltetrahydrophthalic anhydride, methyl nadic anhydride, hexahydrophthalic anhydride, methylhexahydrophthalic anhydride, 2-methylimidazole, triphenyl phosphine, 2-ethyl-4-methylimidazole, BF-3 amine complexes and guanidine derivatives; and ultraviolet curing agents such as diphenyliodonium hexafluorophosphate and triphenylsulfonium hexafluorophosphate.

The mixing ratio between a polymer containing a repeating unit represented by general formula (1) and an epoxy compound is a mass ratio (polymer:epoxy compound) of 10:90 to 98:2, preferably 50:50 to 95:5.

The mixing ratio between an epoxy compound and a curing agent for epoxy resin is a mass ratio of 70:30 to 99.5:0.5, preferably 90:10 to 99:1.

At some midpoint in process for producing the gas separation membrane, these may be applied to a glass or silicon substrate and then heated or irradiated with ultraviolet rays (UV) by ultraviolet lamp or the like so as to be cured, thereby producing a gas separation membrane cured by cross-linking. Organic solvents are usable without particular limitation so long as a composition containing polyimide subjected to substitution for a HFIP group and having a repeating unit represented by general formula (1) and an epoxy resin as the primary components can be dissolved therein. Concrete examples are amide-based solvents such as N,N-dimethylformamide, N,N-dimethylacetamide, N-methylformaldehyde, hexamethylphosphoric triamide and N-methyl-2-pyrrolidone. In addition, it is also possible to cite cyclohexanone, propylene glycol monomethyl ether acetate and γ-butyrolactone.

EXAMPLES

Hereinafter the present invention will specifically be explained with reference to examples; however, the present invention is not limited by these examples.

[Preparation of Polyimide Membrane]

Preparation of a HFIP group-containing polyimide membrane for use in a gas separation membrane will be discussed.

A 200 mL three-neck flask having a nitrogen-introducing tube and a reflux condenser was charged with 2.00 g (3.78 mmol) of HFA-MDA, 1.68 g (3.78 mmol) of 6FDA and 14 g of N-methylpyrrolidone and then stirred in an atmosphere of nitrogen at room temperature for 3 hours, thereby causing a reaction as shown below.

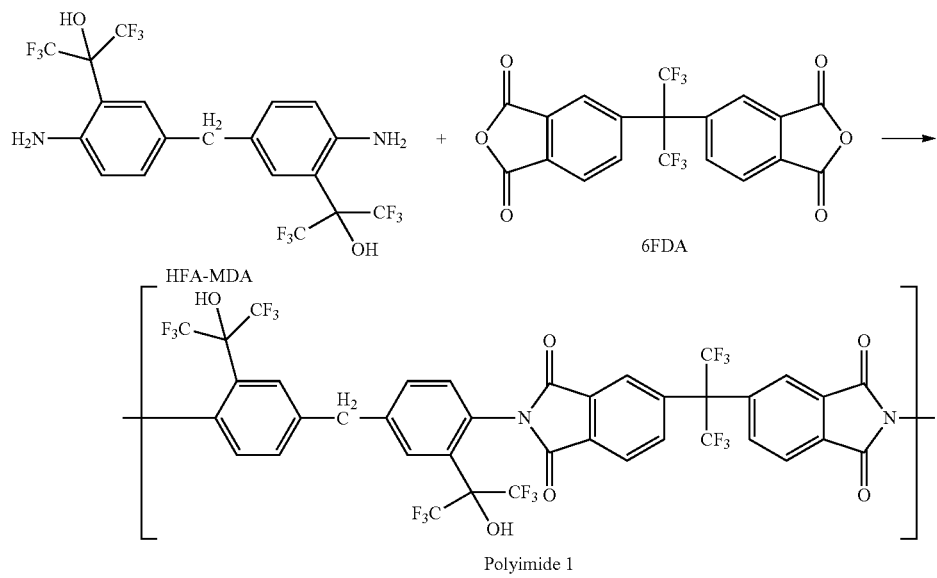

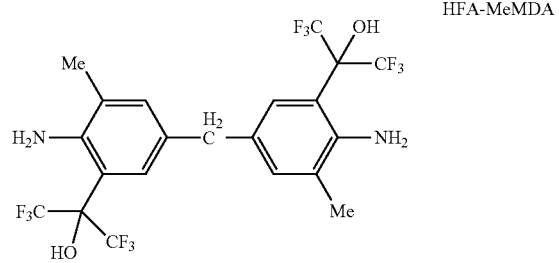

A reaction liquid thus obtained was increased in temperature to 200° C. and stirred for 6 hours and then cooled to room temperature thereby obtaining a uniform N-methylpyrrolidone solution.

The N-methylpyrrolidone solution was applied to a glass substrate, followed by spin coating by using spin coater under the application condition of a rotation speed of 1000 rpm and 30 seconds of retention time. The thus obtained glass substrate was heat-treated in an atmosphere of nitrogen at 200° C. for 1 hour and then a membrane formed of Polyimide 1 was peeled from the glass substrate, thereby obtaining a HFIP group-containing imide membrane (Polyimide 1). As a result of measuring the membrane thickness, it was confirmed to be 18 μm.

Then, a series of HFIP group-containing diamine compounds (HFA-ODA, HFA-MeMDA, HFA-PPD, HFA-MPD, HFA-FL, HFA-NAP, HFA-AF) as follows:

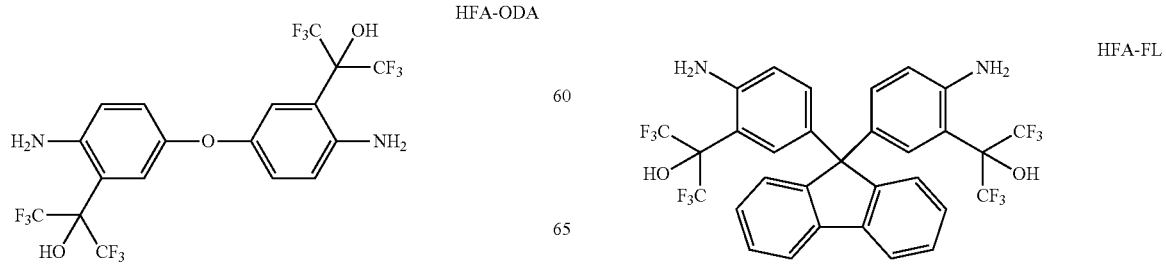

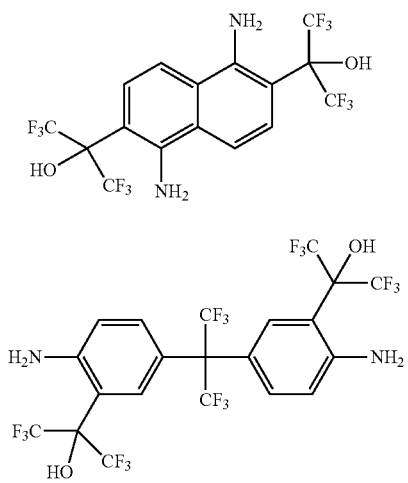

HFA-NAP

HFA-AF were reacted with tetracarboxylic dianhydrides (PMDA, BPDA, BTDA, NPDA) as follows:

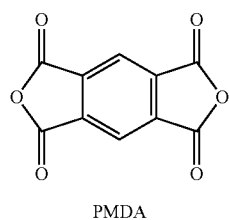

PMDA

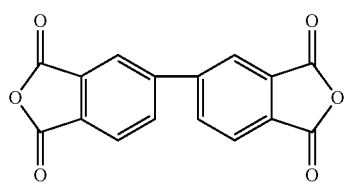

BPDA

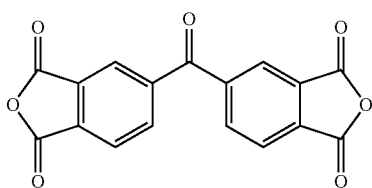

BTDA

NPDA and then the above-mentioned procedures were repeated, thereby obtaining imide membranes formed through reactions of Polyimide 2 to Polyimide 20.

TABLE 1

| Imide Membrane | Diamine Compound | Tetra-carboxylic Dianhydride | Membrane Thickness |
| --- | --- | --- | --- |
| Polyimide 2 | HFA—MDA | BPDA | 20 μm |
| Polyimide 3 | HFA—MDA | BTDA | 23 μm |
| Polyimide 4 | HFA—MDA | PMDA | 30 μm |
| Polyimide 5 | HFA—MDA | NPDA | 19 μm |
| Polyimide 6 | HFA—PPD | 6FDA | 22 μm |
| Polyimide 7 | HFA—PPD | BPDA | 27 μm |
| Polyimide 8 | HFA—PPD | BTDA | 21 μm |
| Polyimide 9 | HFA—PPD | PMDA | 17 μm |
| Polyimide 10 | HFA—ODA | 6FDA | 20 μm |
| Polyimide 11 | HFA—ODA | PMDA | 27 μm |
| Polyimide 12 | HFA—ODA | BTDA | 25 μm |
| Polyimide 13 | HFA—MeMDA | 6FDA | 21 μm |
| Polyimide 14 | HFA—MeMDA | BTDA | 22 μm |
| Polyimide 15 | HFA—FL | 6FDA | 19 μm |
| Polyimide 16 | HFA—FL | BPDA | 21 μm |
| Polyimide 17 | HFA—MDA/HFA—NAP(1/1)[a] | 6FDA | 22 μm |
| Polyimide 18 | HFA—MDA/HFA—NAP(1/2)[a] | PMDA | 18 μm |
| Polyimide 19 | HFA—MDA/HFA—MPD(1/1)[a] | 6FDA | 22 μm |
| Polyimide 20 | HFA—MDA/HFA—AF(1/2)[a] | BPDA | 20 μm |

Note
[a] A parenthesized number represents a mole ratio at the time of charging, between both diamine compounds.

Then, a series of HFIP group-containing diamine compounds (HFA-ODA, HFA-MeMDA, HFA-PPD, HFA-MPD, HFA-FL, HFA-NAP, HFA-AF) and a series of tetracarboxylic dianhydrides (PMDA, BPDA, BTDA, NPDA) were combined. To a NMP solution obtained after polymerization reaction, a certain amount of the following epoxy resin 1 or 2 and triphenyl phosphine as a curing agent (in an amount of 1 mass % relative to epoxy resin) were added to produce Polyimides 21 to 27 and then membranes formed containing these are obtained. The results are shown in Table 2.

Epoxy Resin 1: Bisphenol A type epoxy resin (available from Mitsubishi Chemical Corporation under the trade name of JER828)

Epoxy Resin 2: Cresol novolac epoxy resin (available from Sigma-Aldrich, Catalog No. 408042)

TABLE 2

| Imide Membrane | Diamine Compound | Tetra-carboxylic Anhydride | Epoxy Resin | Membrane Thickness |
| --- | --- | --- | --- | --- |
| Polyimide 21 | HFA—MDA | BPDA | Epoxy Resin 1 (5)[a] | 23 μm |
| Polyimide 22 | HFA—MDA | PMDA | Epoxy Resin 1 (10)[a] | 30 μm |
| Polyimide 23 | HFA—PPD | BPDA | Epoxy Resin 1 (10)[a] | 32 μm |
| Polyimide 24 | HFA—ODA | 6FDA | Epoxy Resin 1 (10)[a] | 23 μm |
| Polyimide 25 | HFA—ODA | BTDA | Epoxy Resin 1 (20)[a] | 24 μm |
| Polyimide 26 | HFA—MeMDA | 6FDA | Epoxy Resin 2 (10)[a] | 22 μm |
| Polyimide 27 | HFA—FL | BTDA | Epoxy Resin 2 (20)[a] | 19 μm |

Note
[a] A parenthesized number represents a mass percentage of epoxy resin relative to the total mass of diamine compound and tetracarboxylic dianhydride.

[Evaluation of Polyimide 1]

On Polyimide 1, measurement of the gas permeability coefficient and evaluation of the separation performance were conducted. A method of measuring the gas permeability coefficient of a gas separation membrane will be discussed below.

The gas permeability coefficient was measured upon disposing a gas separation membrane having a membrane area of 7 cm² on a cell formed of stainless steel, according to a differential-pressure method discussed in Part 1 of Japanese Industrial Standard JIS K 7126-1 (2006) "Plastics—Film and sheeting—Determination of gas-permeation rate".

More specifically, helium (He), carbonic acid gas ($CO_2$), oxygen gas ($O_2$), nitrogen gas ($N_2$) and methane gas ($CH_4$)

were used as sample gases under a condition of a temperature of 23° C. thereby measuring the gas permeability coefficient and the separation performance (a ratio among the permeability coefficients of the gases) of each of the gases according to JIS K 7126-1 (2006).

A result of measuring the gas permeability coefficient of a membrane formed containing Polyimide 1 according to the above-mentioned JIS K 7126-1 (2006) is shown in Table 3, and a result of evaluating the separation performance is shown in Table 4.

The gas permeability coefficient varied depending on the kind of gas. The ratio of the permeability coefficient between He and CH4 was 155 and therefore a performance sufficient for a gas separation membrane was exhibited.

TABLE 3

Result of Measuring Gas Permeability coefficient

| | Permeability coefficient (unit: Barrer) | | | |
|---|---|---|---|---|
| | He | $CO_2$ | $O_2$ | $N_2$ | $CH_4$ |
| Polyimide 1 | 158 | 78 | 19 | 3.1 | 1.0 |

(1 Barrer = $10^{-10}$ cm$^3$ (STP) cm/cm$^2$ sec cmHg)

TABLE 4

Result of Evaluating Separation Performance

| | Separation Performance (unit: none) | | | |
|---|---|---|---|---|
| | $CO_2/CH_4$ | $CO_2/N_2$ | $He/N_2$ | $He/CH_4$ |
| Polyimide 1 | 76 | 25 | 51 | 155 |

Comparison between Polyimide 1 and Conventional Resin

Comparative Example 1

Then, a comparison of gas separation performance was made between the HFIP group-containing polyimide membrane (Polyimide 1) and a conventional polyimide membrane not included in the scope of the present invention, the conventional one not containing a HFIP group but containing fluorine and represented by the following structural formula (Comparative Example 1).

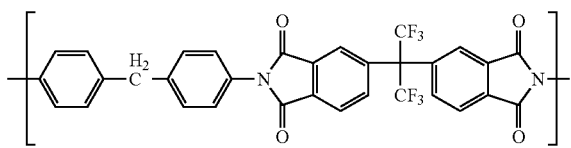

Polyimide Membrane of Comparative Example 1

A HFIP group-containing polyimide membrane (Polyimide 1) of Example 2, which is to be used for a gas separation membrane of the present invention, was compared with a polyimide membrane of Comparative Example 1 (a membrane not included in the scope of the present invention and not containing a HFIP group but containing a hexafluoroisopropylidene group) in terms of gas separation performance. Incidentally, the gas separation performance refers to data discussed in Non-Patent Publication 2. Table 4 shows the gas permeability coefficient of the fluorine-containing polyimide of Comparative Example 1, concerning each of He, $CO_2$, $O_2$ and $CH_4$.

If comparisons are made between Tables 1 and 3, the values of the permeation performance of He and $CO_2$ of the gas separation membrane of Example 1 (the membrane being formed to contain Polyimide 1 and serving as a HFIP group-containing polyimide membrane of the present invention) are found to be larger than those of the separation performance of He and $CO_2$ of the conventional fluorine-containing polyimide membrane discussed as Comparative Example 1 not included in the scope of the present invention). As shown in Table 5, the gas separation membrane of Example 2 (formed from a HFIP group-containing polyimide of the present invention) was superior to the gas separation membrane of Comparative Example 1 in separation performance.

TABLE 5

| | Permeability coefficient (unit; Barrer) | | | |
|---|---|---|---|---|
| | He | $CO_2$ | $O_2$ | $CH_4$ |
| Comparative Example 1 | 50 | 24 | 4.6 | 0.43 |

(1 Barrer = $10^{-10}$ cm$^3$ (STP) cm/cm$^2$ sec cmHg)

TABLE 6

| | Separation Performance (unit: none) | |
|---|---|---|
| | $CO_2/CH_4$ | $He/CH_4$ |
| Polyimide 1 | 76 | 155 |
| Comparative Example 1 | 56 | 113 |

[Evaluation of Polyimide 3, Polyimide 4, Polyimide 7, Polyimide 21 and Polyimide 22]

By the same evaluation method as made on Polyimide 1, measurement of the gas permeability coefficient and evaluation of the separation performance were conducted on Polyimide 3, Polyimide 4, Polyimide 7, Polyimide 21 and Polyimide 22. Results of measuring the gas permeability coefficient are shown in Table 7, and results of evaluating the separation performance is shown in Table 8.

TABLE 7

| | Permeability coefficient (unit: Barrer) | | | | |
|---|---|---|---|---|---|
| | He | $CO_2$ | $O_2$ | $N_2$ | $CH_4$ |
| Polyimide 3 | 90 | 34 | 9.3 | 1.6 | 0.6 |
| Polyimide 4 | 96 | 24 | 8.3 | 1.3 | 0.6 |
| Polyimide 7 | 26 | 4.6 | 1.3 | 1.1 | 0.1 |
| Polyimide 21 | 37 | 15 | 3.0 | 0.5 | 0.2 |
| Polyimide 22 | 39 | 18 | 3.1 | 0.6 | 0.1 |

(1 Barrer = $10^{-10}$ cm$^3$ (STP) cm/cm$^2$ sec cmHg)

TABLE 8

| | Separation Performance (unit: none) | | | |
|---|---|---|---|---|
| | $CO_2/CH_4$ | $CO_2/N_2$ | $He/N_2$ | $He/CH_4$ |
| Polyimide 3 | 57 | 21 | 56 | 150 |
| Polyimide 4 | 40 | 18 | 74 | 160 |
| Polyimide 7 | 46 | 4.2 | 24 | 260 |

TABLE 8-continued

| | Separation Performance (unit: none) | | | |
|---|---|---|---|---|
| | $CO_2/CH_4$ | $CO_2/N_2$ | $He/N_2$ | $He/CH_4$ |
| Polyimide 21 | 75 | 30 | 74 | 185 |
| Polyimide 22 | 180 | 30 | 65 | 390 |

[Comparison of Separation Membrane Performance Among Polyimide 3, Polyimide 4, Polyimide 7, Polyimide 21, Polyimide 22 and Conventional Resin]

Then, UPILEX (available from UBE INDUSTRIES, LTD.) and Kapton (available from DU PONT-TORAY CO., LTD.) were selected as conventional resins and compared with the above-mentioned Polyimide 3, Polyimide 4, Polyimide 7, Polyimide 21 and Polyimide 22 in terms of permeability coefficient and separation performance. Results of measuring the gas permeability coefficient are shown in Table 9, and results of evaluating the separation performance is shown in Table 10. Incidentally, the permeability coefficient and the separation performance of UPILEX and Kapton were measured by the same method as applied to Polyimide 1.

TABLE 9

| | Permeability coefficient (unit: Barrer) | | | | |
|---|---|---|---|---|---|
| | He | $CO_2$ | $O_2$ | $N_2$ | $CH_4$ |
| UPILEX | 1.2 | 0.67 | 0.34 | 0.16 | 0.12 |
| Kapton | 0.41 | 0.16 | 0.02 | 0.01 | 0.04 |

(1 Barrer = $10^{-10}$ cm$^3$ (STP) cm/cm$^2$ sec cmHg)

TABLE 10

| | Separation Performance (unit: none) | | | |
|---|---|---|---|---|
| | $CO_2/CH_4$ | $CO_2/N_2$ | $He/N_2$ | $He/CH_4$ |
| UPILEX | 5.6 | 4.2 | 7.5 | 10 |
| Kapton | 4 | 16 | 41 | 10 |

In comparison of the results of measuring the permeability coefficient as shown in Tables 7 and 9, it was confirmed that the permeability coefficients of Polyimide 3, Polyimide 4, Polyimide 7, Polyimide 21 and Polyimide 22 were higher than those of the conventional resins (i.e., UPILEX and Kapton).

Furthermore, on comparison of the results of measuring the permeability coefficient as shown in Tables 8 and 10, it was confirmed that Polyimide 3, Polyimide 4, Polyimide 7, Polyimide 21 and Polyimide 22 of the present invention had a higher separation performance than the conventional resins (i.e., UPILEX and Kapton) had.

Thus, Polyimide 3, Polyimide 4, Polyimide 7, Polyimide 21 and Polyimide 22 were higher than the conventional resins (UPILEX and Kapton) in permeability coefficient and separation performance, and therefore superior in performances of the separation membrane.

[Comparison of Separation Membrane Performance Among Polyimide 2, Polyimide 5, Polyimide 6, Polyimides 8 to 20, Polyimides 23 to 27 and Conventional Resin]

Then, UPILEX and Kapton were selected as conventional resins and compared with Polyimide 2, Polyimide 5, Polyimide 6, Polyimides 8 to 20 and Polyimides 23 to 27 in terms of the permeability coefficient of $CO_2$ and the separation performance of $CO_2/CH_4$.

The $CO_2$ permeability coefficients of Polyimide 2, Polyimide 5, Polyimide 6, Polyimides 8 to 20 and Polyimides 23 to 27 ranged from 4 to 82 Barrer while the $CO_2$ permeability coefficients of the Kapton membrane and the UPILEX membrane were 0.67 Barrer and 0.16 Barrer, respectively. With this, it was confirmed that imide membranes formed containing Polyimide 2, Polyimide 5, Polyimide 6, Polyimides 8 to 20 and Polyimides 23 to 27 of the present intention had high $CO_2$ permeability coefficient.

The $CO_2/CH_4$ separation performances of Polyimide 2, Polyimide 5, Polyimide 6, Polyimides 8 to 20 and Polyimides 23 to 27 ranged 18 to 62 while those of the Kapton membrane and the UPILEX membrane were 5.6 and 4, respectively. With this, it was confirmed that Polyimide 2, Polyimide 5, Polyimide 6, Polyimides 8 to 20 and Polyimides 23 to 27 of the present intention had higher $CO_2$ permeability coefficient and higher $CO_2/CH_4$ separation performance.

Thus, Polyimide 2, Polyimide 5, Polyimide 6, Polyimides 8 to 20 and Polyimides 23 to 27 were higher than UPILEX and Kapton (conventional resins) in $CO_2$ permeability coefficient and $CO_2/CH_4$ separation performance, so that these polyimides were confirmed to serve as separation membranes superior to the conventional ones.

INDUSTRIAL APPLICABILITY

A gas separation membrane formed from a HFIP group-containing polyimide membrane of the present invention has a permeation rate (a gas permeability coefficient) which dramatically varies according to the kind of gas and excellent in gas separation performance. Hence the membrane can be preferably applied to a technique of separating carbon dioxide from liquefied natural gas and the like and fixing it, and preferably used as a water/ethanol separation membrane provided for the purpose of recovering a fuel-use ethanol, or the like.

The invention claimed is:

1. A gas separation membrane, comprising:
a polyimide that contains a repeating unit represented by general formula (1)

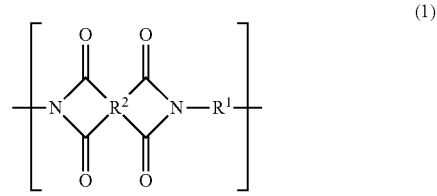

wherein $R^1$ is a divalent organic group containing a 2-hydroxy-1,1,1,3,3,3-hexafluoroisopropyl (HFIP) group and
$R^2$ is a tetravalent organic group.

2. A gas separation membrane as in claim 1, wherein $R^1$ is a divalent organic group represented by general formula (2)

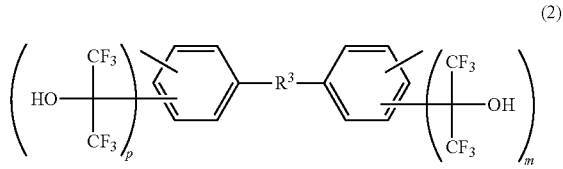

where $R^3$ is a single bond, an oxygen atom, a sulfur atom, $SO_2$, $CH_2$, $CO$, $C(CH_3)_2$, $C(CH_3)(CH_2CH_3)$, $C(CF_3)_2$, or a divalent organic group formed by removing two hydrogen atoms from a $C_3$-$C_{12}$ alicyclic hydrocarbon or $C_6$-$C_{25}$ aromatic hydrocarbon; and "m" and "p" mutually independently represent an integer of 0 to 2 such that $1 \leq m+p \leq 4$.

3. A gas separation membrane as in claim 2, wherein the divalent organic group represented by the general formula (2) is a divalent organic group represented by formula (3)

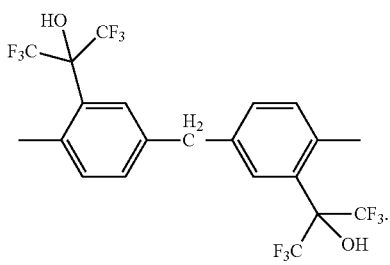
(3)

4. A gas separation membrane as in claim 2, wherein the divalent organic group represented by the general formula (2) is a divalent organic group represented by formula (4)

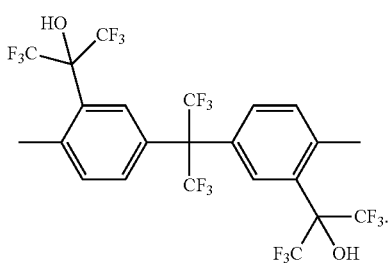
(4)

5. A gas separation membrane as in claim 2, wherein the divalent organic group represented by the general formula (2) is a divalent organic group represented by formula (5)

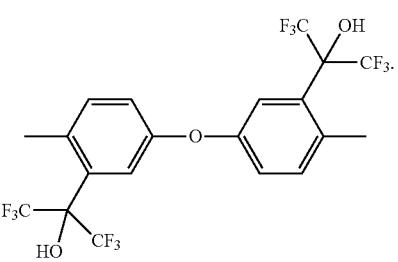
(5)

6. A gas separation membrane as in claim 1, wherein the divalent organic group represented by $R^1$ is a divalent organic group represented by general formula (6)

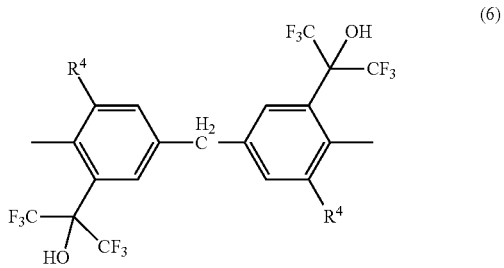
(6)

where $R^4$ mutually independently represents at least one kind of monovalent organic group selected from the group consisting of a $C_1$-$C_{10}$ alkyl group, alkoxyl group, carboxyl group, ester group, hydroxyl group, nitro group, cyano group, chloro group, bromo group and fluoroalkyl group.

7. A gas separation membrane as in claim 6, wherein the divalent organic group represented by the general formula (6) is a divalent organic group represented by formula (7)

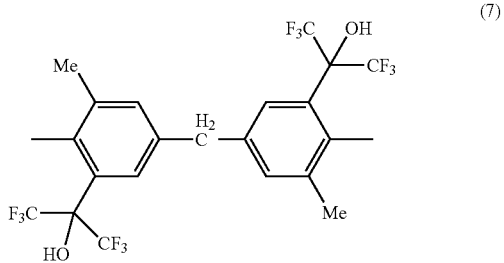
(7)

where "Me" represents a methyl group.

8. A gas separation membrane as in claim 1, wherein the divalent organic group represented by $R^1$ is a divalent organic group represented by general formula (8)

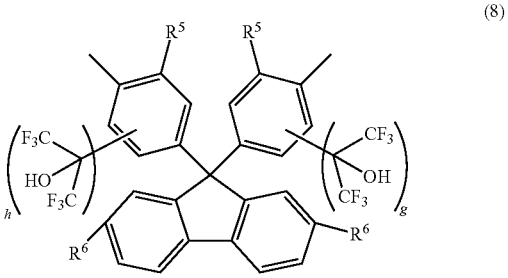
(8)

where $R^5$ mutually independently represents at least one kind of monovalent organic group selected from the group consisting of a hydrogen atom, methyl group, ethyl group, isopropyl group, chloro group, fluoro group, trifluoromethyl group, phenyl group, methoxy group and nitro group; $R^6$ mutually independently represents at least one kind of monovalent organic group selected from the group consisting of a hydrogen atom, phenyl group, naphthyl group, biphenyl group, sulfo group, ethynylene structure-containing group, bromo group, chloro group, fluoro group and iodo group; and "g" and "h" mutually independently represent any integer of 0, 1 and 2 such that $1 \leq g+h \leq 4$.

9. A gas separation membrane as in claim 8, wherein the divalent organic group represented by the general formula (8) is a divalent organic group represented by formula (9)

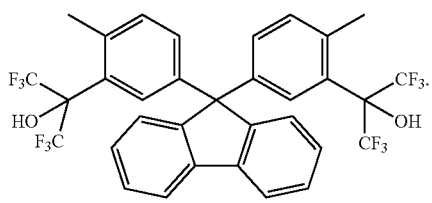
(9)

10. A gas separation membrane as in claim 1, wherein $R^1$ is a divalent organic group represented by general formula (10)

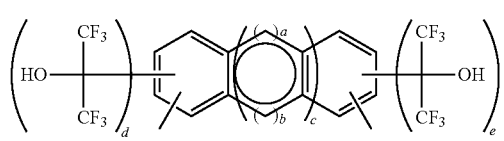
(10)

where "a" and "b" mutually independently represent an integer of 0 to 2 such that a+b≥1; "c" is an integer of not smaller than 0 and not larger than 3; "d" and "e" mutually independently represent an integer of 0 to 2 such that 1≤d+e≤4; and a moiety is represented in the formula (10) by the following formula:

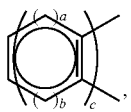

in which a carbon atom may be substituted with a hetero atom (a nitrogen atom, oxygen atom or sulfur atom), a hydrogen atom may be substituted with a substituent, and the substituent may contain a nitrogen atom, oxygen atom or sulfur atom.

11. A gas separation membrane as in claim 10, wherein the divalent organic group represented by the general formula (10) is a divalent organic group represented by formula (11)

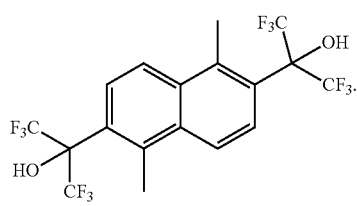
(11)

12. A gas separation membrane as in claim 1, wherein the divalent organic group represented by $R^1$ is a divalent organic group represented by general formula (12)

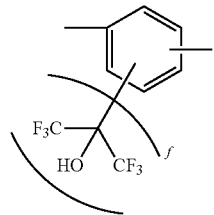
(12)

where "f" is an integer of 1 or 2.

13. A gas separation membrane as in claim 12, wherein the divalent organic group represented by the general formula (12) is a divalent organic group represented by formula (13)

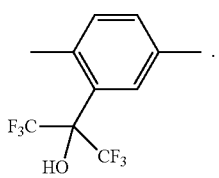
(13)

14. A gas separation membrane as in claim 12, wherein the divalent organic group represented by the general formula (12) is a divalent organic group represented by formula (14)

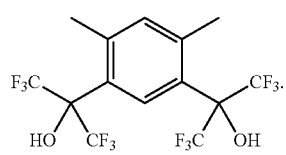
(14)

15. A gas separation membrane as in claim 1, wherein the tetravalent organic group represented by $R^2$ is a tetravalent organic group represented by formula (15)

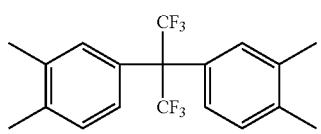
(15)

16. A gas separation membrane as in claim 1, wherein a hydrogen atom of OH group that 2-hydroxy-1,1,1,3,3,3-hexafluoroisopropyl group contained in $R^1$ is substituted with a glycidyl group.

17. A gas separation membrane as in claim 16, wherein the glycidyl group forms crosslinking in a manner that its cyclic ether moiety is opened.

18. A gas separation membrane as in claim 1, obtained by being mixed with an epoxy compound and then heated.

19. A gas separation membrane as in claim 18, wherein the epoxy compound is represented by the general formula (16)

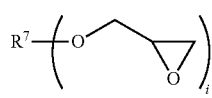

(16)

where $R^7$ is a monovalent to tetravalent organic group formed by removing one hydrogen atom from an alkane, aromatic compound or alicyclic compound and may contain an oxygen atom, sulfur atom or nitrogen atom in its structure, wherein a part of hydrogen atoms may be substituted with fluorine atom, chlorine atom, alkyl group or fluoroalkyl group; and "i" is an integer of 1 to 4.

20. A process for separating a gas mixture containing a first gas component and a second gas component, the process comprising the steps of:

(a) providing a gas separation membrane comprising a 2-hydroxy-1,1,1,3,3,3-hexafluoroisopropyl (HFIP) group-containing polyimide that contains a repeating unit represented by general formula (1)

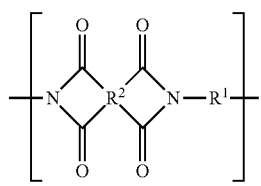

(1)

wherein $R^1$ represents a divalent organic group containing a HFIP group and $R^2$ represents a tetravalent organic group; and (b) passing the gas mixture through the gas separation membrane such that the first gas component is more selectively passed through the gas separation membrane than the second gas component is, thereby separating the first gas component and the second gas component from each other.

21. The process as in claim 20, wherein $R^1$ is a divalent organic group represented by general formula (2)

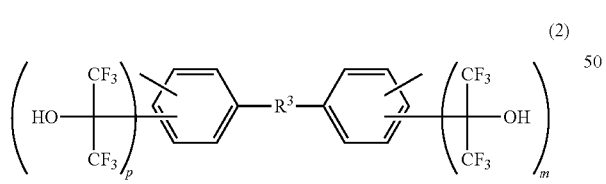

(2)

where $R^3$ is a single bond, an oxygen atom, a sulfur atom, $SO_2$, $CH_2$, CO, $C(CH_3)_2$, $C(CH_3)(CH_2CH_3)$, $C(CF_3)_2$, or a divalent organic group formed by removing two hydrogen atoms from a $C_3$-$C_{12}$ alicyclic hydrocarbon or $C_6$-$C_{25}$ aromatic hydrocarbon; and "m" and "p" mutually independently represent an integer of 0 to 2 such that $1 \leq m+p \leq 4$.

22. The process as in claim 21, wherein the divalent organic group represented by the general formula (2) is a divalent organic group represented by formula (3)

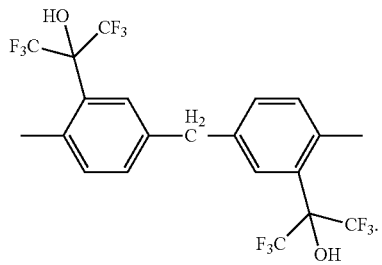

(3)

23. The process as in claim 21, wherein the divalent organic group represented by the general formula (2) is a divalent organic group represented by formula (4)

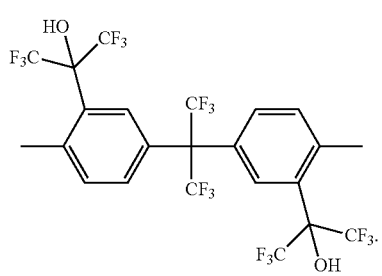

(4)

24. The process as in claim 21, wherein the divalent organic group represented by the general formula (2) is a divalent organic group represented by formula (5)

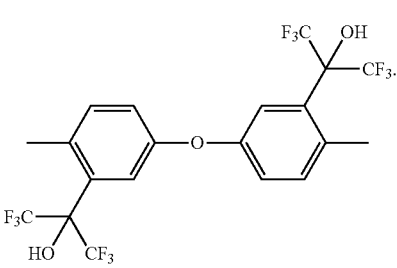

(5)

25. The process as in claim 20, wherein the divalent organic group represented by $R^1$ is a divalent organic group represented by general formula (6)

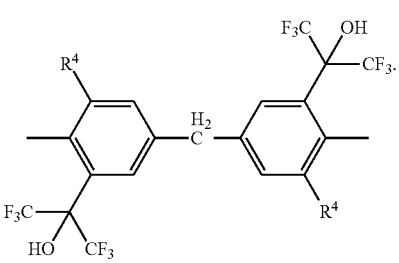

(6)

where $R^4$ mutually independently represents at least one kind of monovalent organic group selected from the group consisting of a $C_1$-$C_{10}$ alkyl group, alkoxyl group, carboxyl group, ester group, hydroxyl group, nitro group, cyano group, chloro group, bromo group and fluoroalkyl group.

26. The process as in claim 25, wherein the divalent organic group represented by the general formula (6) is a divalent organic group represented by formula (7)

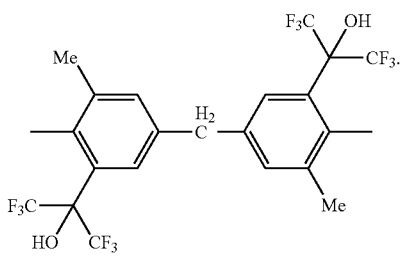

(7)

where "Me" represents a methyl group.

27. The process as in claim 20, wherein the divalent organic group represented by R¹ is a divalent organic group represented by general formula (8)

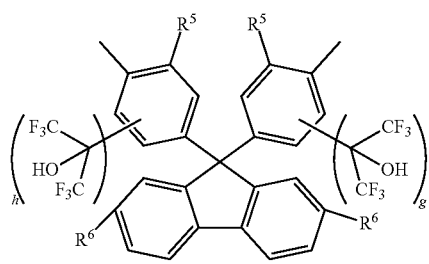

(8)

where $R^5$ mutually independently represents at least one kind of monovalent organic group selected from the group consisting of a hydrogen atom, methyl group, ethyl group, isopropyl group, chloro group, fluoro group, trifluoromethyl group, phenyl group, methoxy group and nitro group, $R^6$ mutually independently represents at least one kind of monovalent organic group selected from the group consisting of a hydrogen atom, phenyl group, naphthyl group, biphenyl group, sulfo group, ethynylene structure-containing group, bromo group, chloro group, fluoro group and iodo group, and "g" and "h" mutually independently represent any integer of 0, 1 and 2 such that 1≤g+h≤4.

28. The process as in claim 27, wherein the divalent organic group represented by the general formula (8) is a divalent organic group represented by formula (9)

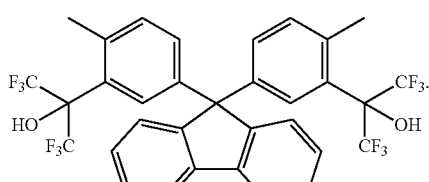

(9)

29. The process as in claim 20, wherein R¹ is a divalent organic group represented by general formula (10)

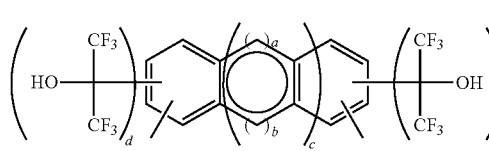

(10)

where "a" and "b" mutually independently represent an integer of 0 to 2 such that a+b≥1, "c" is an integer of not smaller than 0 and not larger than 3, "d" and "e" mutually independently represent an integer of 0 to 2 such that 1≤d+e≤4, and a moiety is represented in the formula (10) by the following formula:

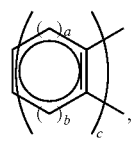

in which a carbon atom may be substituted with a hetero atom (a nitrogen atom, oxygen atom or sulfur atom), and a hydrogen atom may be substituted with a substituent, and the substituent may contain a nitrogen atom, oxygen atom or sulfur atom.

30. The process as in claim 29, wherein the divalent organic group represented by the general formula (10) is a divalent organic group represented by formula (11)

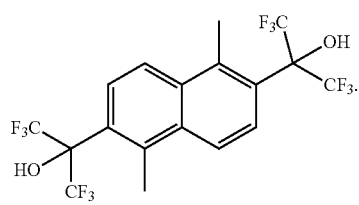

(11)

31. The process as in claim 20, wherein the divalent organic group represented by R¹ is a divalent organic group represented by general formula (12)

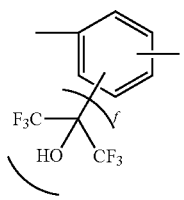

(12)

where "f" is an integer of 1 or 2.

32. The process as in claim 31, wherein the divalent organic group represented by the general formula (12) is a divalent organic group represented by formula (13)

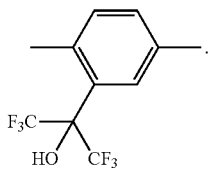
(13)

33. The process as in claim 31, wherein the divalent organic group represented by the general formula (12) is a divalent organic group represented by formula (14)

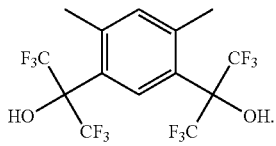
(14)

34. The process as in claim 20, wherein the tetravalent organic group represented by $R^2$ is a tetravalent organic group represented by formula (15)

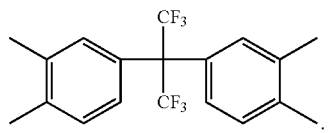
(15)

35. The process as in claim 20, wherein a hydrogen atom of a OH group of 2-hydroxy-1,1,1,3,3,3-hexafluoroisopropyl group contained in $R^1$ is substituted with a glycidyl group.

36. The process as in claim 35, wherein the glycidyl group forms crosslinking in a manner that its cyclic ether moiety is opened.

37. The process as in claim 20, wherein the gas separation membrane is obtained by a method comprising the steps of mixing the polyimide with an epoxy compound to prepare a mixture and then heating the mixture.

38. The process as in claim 37, wherein the epoxy compound is represented by the general formula (16)

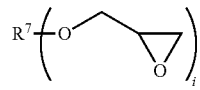
(16)

where $R^7$ is a monovalent to tetravalent organic group formed by removing one hydrogen atom from an alkane, aromatic compound or alicyclic compound and may contain an oxygen atom, sulfur atom or nitrogen atom in its structure, a part of hydrogen atoms may be substituted with fluorine atom, chlorine atom, alkyl group or fluoroalkyl group, and "i" is an integer of 1 to 4.

39. The process as in claim 20, wherein the first gas component is at least one selected from the group consisting of He and $CO_2$, and the second gas component is at least one selected from the group consisting of $N_2$ and $CH_4$.

\* \* \* \* \*